United States Patent
Wyatt et al.

(10) Patent No.: US 10,904,333 B2
(45) Date of Patent: Jan. 26, 2021

(54) RESOLVER-BASED DATA STORAGE AND RETRIEVAL SYSTEM AND METHOD

(71) Applicant: Pavlov Media, Inc., Champaign, IL (US)

(72) Inventors: Bartow Wyatt, Champaign, IL (US); Robert Saska, Champaign, IL (US)

(73) Assignee: Pavlov Media, Inc., Champaign, IL (US)

( * ) Notice: Subject to any disclaimer, the term of this patent is extended or adjusted under 35 U.S.C. 154(b) by 0 days.

(21) Appl. No.: 15/721,327

(22) Filed: Sep. 29, 2017

(65) Prior Publication Data

US 2019/0104177 A1    Apr. 4, 2019

Related U.S. Application Data

(60) Division of application No. 14/213,179, filed on Mar. 14, 2014, now Pat. No. 9,781,070, which is a continuation-in-part of application No. 14/192,292, filed on Feb. 27, 2014, now Pat. No. 10,601,943, said application No. 14/213,179 is a continuation-in-part of application No. 14/192,320, filed on Feb. 27, 2014, said application No. 14/213,179 is a continuation-in-part of application No. 14/192,355, filed on Feb. 27, 2014, now Pat. No. 10,581,996, said application No. 14/213,179 is a continuation-in-part of application No. 14/192,378, filed on Feb. 27, 2014, now Pat. No. 10,264,090, said application No. 14/213,179 is a continuation-in-part of application No. 14/206,952, filed on Mar. 12, 2014.

(60) Provisional application No. 61/770,163, filed on Feb. 27, 2013, provisional application No. 61/770,186, filed on Feb. 27, 2013, provisional application No. 61/770,204, filed on Feb. 27, 2013, provisional application No. 61/770,211, filed on Feb. 27, 2013, provisional application No. 61/777,908, filed on Mar. 12, 2013, provisional application No. 61/790,474, filed on Mar. 15, 2013.

(51) Int. Cl.
| | |
|---|---|
| *H04L 29/08* | (2006.01) |
| *H04L 29/12* | (2006.01) |
| *G06F 16/901* | (2019.01) |

(52) U.S. Cl.
CPC ...... *H04L 67/1097* (2013.01); *G06F 16/9027* (2019.01); *H04L 61/1511* (2013.01); *H04L 61/6009* (2013.01); *H04L 67/2842* (2013.01)

(58) Field of Classification Search
CPC .................................................. H04L 61/1511
See application file for complete search history.

(56) References Cited

U.S. PATENT DOCUMENTS

| | | |
|---|---|---|
| 7,858,457 B2 | 12/2010 | Li |
| 7,958,457 B1 | 6/2011 | Brandenberg |
| 8,060,926 B1 | 11/2011 | Ebrahimi |

(Continued)

*Primary Examiner* — Nicholas P Celani
(74) *Attorney, Agent, or Firm* — James E. Eakin

(57) ABSTRACT

System and method for for associating general data with an end-user based on the domain name system (DNS) resolver that the end-user uses to map the canonical domain names of internet services to their associated network addresses. The present invention elegantly addresses concerns of scale regarding the key-space, for example the global number of distinct DNS resolvers, and the data-space, for example the number of distinct geographical areas to associate.

2 Claims, 3 Drawing Sheets

(56) References Cited

U.S. PATENT DOCUMENTS

| | | |
|---|---|---|
| 8,370,460 B1 | 2/2013 | Khakpour |
| 8,473,358 B1 | 6/2013 | Schuster |
| 8,499,088 B1 | 7/2013 | Breau |
| 8,610,730 B1 | 12/2013 | Li |
| 9,781,070 B2 * | 10/2017 | Wyatt ................. H04L 61/1511 |
| 2004/0049598 A1 | 3/2004 | Tucker |
| 2005/0203924 A1 | 9/2005 | Rosenberg |
| 2006/0018317 A1 | 1/2006 | Jimmel |
| 2007/0070066 A1 | 3/2007 | Bakhash |
| 2007/0180496 A1 | 8/2007 | Fransdonk |
| 2007/0192872 A1 | 8/2007 | Rhoads |
| 2007/0288470 A1 | 12/2007 | Kauniskangas |
| 2008/0022377 A1 | 1/2008 | Chen |
| 2008/0109362 A1 | 5/2008 | Fransdonk |
| 2008/0115168 A1 | 5/2008 | Adwankar |
| 2008/0192820 A1 | 8/2008 | Brooks |
| 2008/0306871 A1 | 11/2008 | Grannan |
| 2009/0125951 A1 | 5/2009 | Agricola |
| 2009/0158346 A1 | 6/2009 | Zer |
| 2009/0198997 A1 * | 8/2009 | Yeap ................... H04L 63/0823 713/155 |
| 2009/0276771 A1 | 11/2009 | Nickolov |
| 2010/0241753 A1 | 9/2010 | Garbajs |
| 2011/0040826 A1 * | 2/2011 | Chadzelek ............ H04L 67/142 709/203 |
| 2011/0258049 A1 | 10/2011 | Ramer |
| 2011/0264649 A1 | 10/2011 | Hsiao |
| 2011/0270964 A1 * | 11/2011 | Huang ............. H04L 29/12066 709/224 |
| 2011/0276993 A1 | 11/2011 | Ferguson |
| 2012/0158985 A1 | 6/2012 | Patten |
| 2012/0298075 A1 | 8/2012 | Crowe |
| 2012/0304072 A1 | 11/2012 | Mercuri |
| 2013/0054822 A1 | 2/2013 | Mordani |
| 2013/0103785 A1 | 4/2013 | Lyon |
| 2014/0101523 A1 | 4/2014 | Bar-Nahum |
| 2015/0172357 A1 | 6/2015 | Olrog |

* cited by examiner

RESOLVER-BASED DATA STORAGE AND RETRIEVAL SYSTEM AND METHOD This application is related to, and claims the benefit of provisional U.S. Patent Application Ser. No. 61/790,474, filed Mar. 15, 2013; Ser. No. 14/206,952, filed Mar. 12, 2014 and which claims the benefit of Ser. No. 61/777,908, filed Mar. 12, 2013; and Ser. No. 14/192,292; Ser. No. 14/192,320; Ser. No. 14/192,355; Ser. No. 14/192,378, all filed on Feb. 27, 2014, all of which claim the benefit of provisional applications having Ser. Nos. 61/770,163; 61/770,186; 61/770,204; and 61/770,211, all filed on Feb. 27, 2013; all of which are incorporated herein by reference as though set forth in full.

FIELD OF THE INVENTION

The present invention relates generally to the field of data storage and retrieval in a networked system and, more particularly, relates to systems and methods for associating data stored to or retrieved from a networked service or application with network infrastructure components not directly involved in the operation itself, for example, the domain name system (DNS) resolver(s) used to resolve the service's network address from its universal resource locator (URL).

BACKGROUND OF THE INVENTION

Network delivered services and applications often benefit from generalities which can be associated with end-users, for example the end-user's current location. This information is used to alter the service in order to achieve a more relevant, higher performing, and ultimately more valuable experience for the end-user.

In order to obtain this information, some services require that an end-user perform a self-identification process, for example manually entering their current location or enabling their device to provide location information on their behalf. The former is a direct inconvenience for the end-user as they are actively involved in improving the service they are consuming. The latter is an indirect inconvenience, but one that also has implications with personal privacy as often times a device configured to provide information on behalf of the end-user, like current location, will do so globally to all services including malicious ones.

Alternatively, some services derive this information based on personally identifiable aspects of the end-users interaction with the service, for example the originating internet address of a request. When the identifiable aspects are not otherwise obfuscated, the service receives data that is too specific to use directly as a generalization and must rely on a mapping from high frequency specific information to useful general information, for example using a database to map one of the ~4.3 billion possible IPv4 internet addresses to a significantly smaller set of geographical regions. Due to the key-space size of these databases, or number of possible IPv4 addresses that identify a single geographical region, the effort required to maintain an accurate result is extremely high as the information scales into larger datasets.

Furthermore, end-users can obfuscate personally identifiable aspects of an interaction by connecting to the service through intermediaries, such as web proxies, or other active methods of obfuscation. Maintaining the ability for an end-user to obfuscate personal data is desirable for personal privacy, however, it effectively defeats systems intended to derive generalized information, which would not otherwise raise privacy concerns from the hidden specific and personally identifiable information.

As a result, there is a great need for a system which can associate general information with an end-user in a way that neither burdens the end-user nor exposes personally identifiable information, and is less costly than maintaining a high-frequency mapping as the associated information scales to larger datasets.

SUMMARY OF THE INVENTION

The present invention provides an efficient system and method for associating general data with an end-user based on the domain name system (DNS) resolver that the end-user uses to map the canonical domain names of internet services to their associated network addresses. The present invention elegantly addresses concerns of scale regarding the key-space, for example the global number of distinct DNS resolvers, and the data-space, for example the number of distinct geographical areas to associate.

In an aspect of the invention, the system comprises an authoritative name server for the domain name associated with a given service and two web servers, which communicate over the internet with an end-user device. An end-user requests location-sensitive content from the service which interacts with the end-user's web browser to automatically associate a general location of the end-user's device with the request and as a result serves a locally relevant version of the requested content.

The service endpoint derives the associated general location by iteratively redirecting the end-user's browser to universal resource locators (URLs) which utilize a constructed series of sub-domains of a specific domain. In advance of the end-user request, the authoritative name server communicates unique permutations of the addresses associated with the two web servers mapped to the series of subdomains to any DNS resolver that requests the mappings as part of the standard operation of a DNS. As a result, the order in which the end-user requests the iterative redirects from the two web servers uniquely identifies the DNS resolver that the end-user uses to resolve names. This allows the service to associate general data with a DNS resolver and as a result a plurality of end-users without requiring more specific information or direct interaction from the end-user or anything on their device other than a standards compliant web browser. This information can then be used for, for example, billing and fee-splitting purposes.

It is therefore one object of the present invention to provide system for associating data with a DNS resolver and in turn the end-users who use that DNS resolver which requires no action from the end-user and accesses no information specific to the end-user.

It is a further object of the present invention to provide a process that achieves this association whose physical and economical resource needs scale, at most, logarithmically with the number of DNS resolvers and number of unique data points that they are mapped to.

These and other objects of the present invention will be apparent from the following detailed description, taken together with the appended Figures.

THE FIGURES

DETAILED DESCRIPTION OF THE INVENTION

Figure 1:
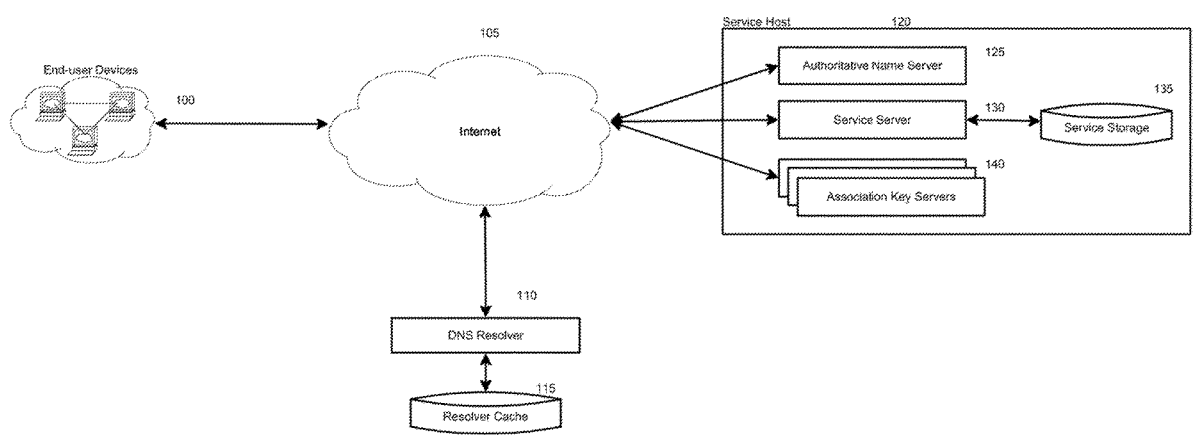
FIG. 1 shows a basic arrangement for practicing an embodiment of one method in accordance with the present invention.
Figure 2:
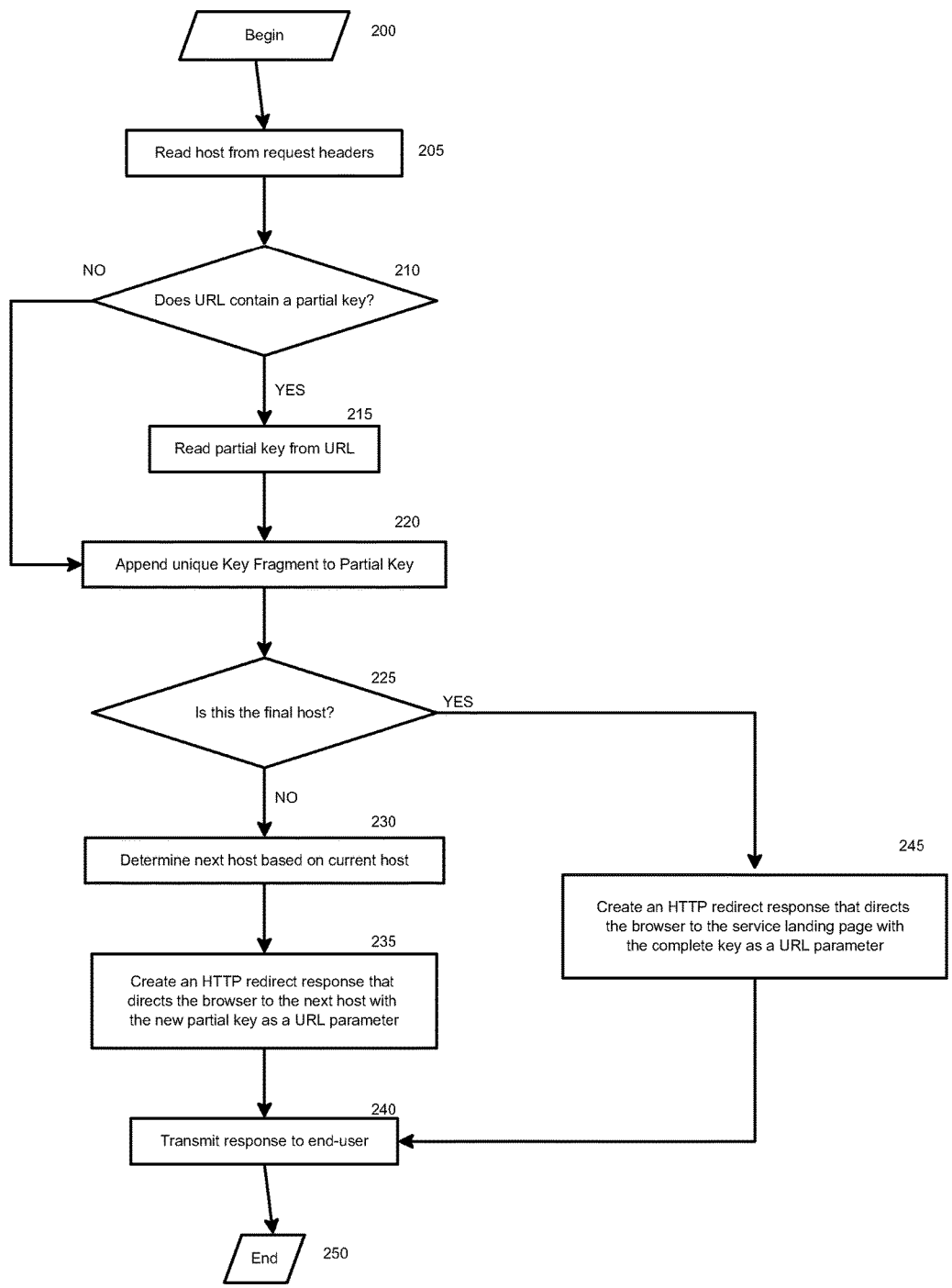
FIG. 2 illustrates an embodiment of a process by which an association key server can iteratively derive the associated data key for an end-user in accordance with the present invention.
Figure 3:
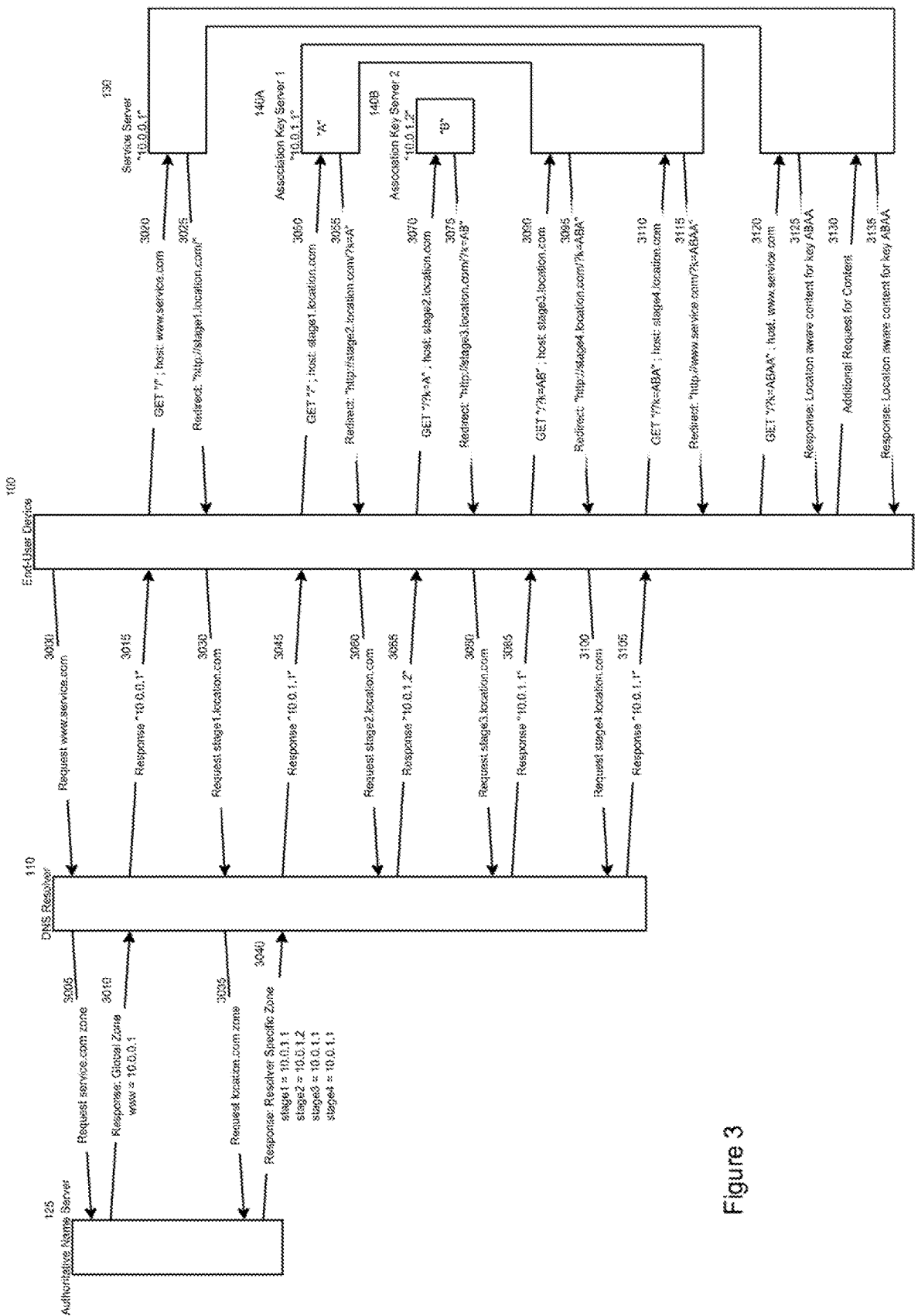
FIG. 3 illustrates the timeline of queries and requests made by an end-user device resulting in a final request with the associated data key.

Referring to FIGS. 1-3, an embodiment of the system and process by which the present invention utilizes a series of low-latency redirects, together with at least two Association Key Servers and a Service Server, to develop network location information for an End-user without the need for disclosure of any private information can be better appreciated. Referring initially to FIG. 1, a group of one or more End-Consumer Devices 100 is connected, through the Internet 105, to a DNS Resolver 110. In at least some embodiments, the End-user Devices 100 can be any device capable of interacting with the Internet, such as laptop computers, desktop computers, smartphones, gaming consoles, etc. The DNS Resolver 110 is, in at least some embodiments, a computer server or other network device capable of translating a domain name, for example "www.service.com", to an associated network address like "10.0.0.1" at the request of an End-user Device 100, through the domain name system (DNS). In at least some embodiments, the DNS Resolver 110 is directly attached to a Resolver Cache 115 which can store mappings from domain names to network addresses locally, in order to accelerate service for the end-user.

The DNS Resolver 110 connects through the Internet 105 to an Authoritative Name Server 125 which, in at least some embodiments, is a computer server or other network device capable of acting as a primary source for mappings from a specific domain name and all of its possible subdomain names to their respective network addresses.

Additionally, the End-user Devices 100 connect through the Internet 105 to a Service Host 120 which is a collection of the necessary components required to produce a basic Internet-delivered service, for example a website. More specifically, the End-user Devices 100 connect to a Service Server 130 and a plurality of Association Key Servers 140. The Service Server 130 is, in at least some embodiments, a computer server capable of servicing requests from End-user Devices and dynamically creating, or retrieving the responses from the directly attached Service Storage 135, for example a web server. The Association Key Servers 140, in at least some embodiments, are computer servers capable of performing a number of rapid request redirection responses to derive an association key for protocol specific servers, for example a set of HTTP web servers.

In a typical embodiment of the system, an End-user Device 100 contacts the Service Server 130 and transmits the desired request, for example a request for the text of a webpage. The Service Server 130 responds to the request with a temporary redirection command that points to the Association Key Servers 140. As a result, the End-user Device 100 contacts a plurality of Association Key Servers 140 in a specific sequence, each time receiving a temporary redirection command for the next server in the sequence. Finally, the last Association Key Server 140 in the sequence responds with a temporary redirection command which points to the Service Server 130, having appended a complete association key. The Service Server 130 then responds with a proper response to the request, based on the complete association key, for example the contents of a webpage specifically tailored to a geographic region identified by the association key.

In order to make a request to the Service Server 130, an End-user Device 100 first requests the mapping of the desired service's domain name to its associated network address from the DNS Resolver 110. The operation of DNS dictates that when a DNS Resolver 110 does not have a valid copy of this mapping within its attached Resolver Cache 115, it connects to the Authoritative Name Server 125 for the domain name and requests the mapping. This process allows a service the ability to modify its mappings and within a reasonable amount of time, see the changes reflected by the End-user devices 100 without having to directly interact with them. Using this process, the Authoritative Name Server 125, in accordance with the present invention, dictates the sequence in which an End-user Device 100 contacts Association Key Servers 140 and as a result the association key the End-user Device 100 transmits to the Service Server 130.

It can be appreciated from the foregoing that an Authoritative Name Server 125 configured to respond with a different mapping for each unique DNS Resolver 110 will, in effect, cause two distinct End-user Devices 100 to transmit a different sequence of requests to the plurality of Association Key Servers 140, if they utilize different DNS Resolvers 110 to map domain names to network addresses. Thus, the present invention creates general associations of the End-user Devices 100 with the DNS Resolvers 110 that they use. Independently, and without requiring any more specific personal information, these associations can be derived by the Service Server 130 through use of the Association Key Servers 140. The resulting "key" relates more useful information with respect to a request from a given End-user Device 100. For example, if a DNS Resolver 110 is known to be deployed as part of a small internet service provider's offerings in Billings, Mont., the Service Server 130 can have reasonable assurances that the End-user Device 100 is located in Billings, Mont., at the time of the request which allows the service to tailor its responses to that city.

In an embodiment which provides monetization services to internet service providers (ISPs) based on their end-users' traffic, the system of the present invention provides a means to automatically associate an end-user with their respective ISP via the ISP's local DNS resolver for accounting purposes, using only DNS information characteristic of a standards compliant web browser, thus avoiding any risk of invasion of privacy. This automatic association efficiently maps several thousand ISP end-users to as few as one or two resolvers, reducing the maintenance, data entry and tracking necessary to effectively operate the service.

Those skilled in the art can appreciate that the length of the sequence of Association Key Servers 140 necessary to derive an association key will have a performance impact on the End-user Device 100: as the sequence grows longer, the number of interactions between an End-user Device 100 and the Association Key Servers 140 increases. The pathological embodiment where the sequence length is 1, and each Association Key Server 140 uniquely maps to a single association key, offers the fastest response for End-user Devices 100. However, this requires that each possible association key have associated with it some expense related to a unique network address and capable computer hardware, does not scale well as datasets increase in size, and breaks down to be equivalent to the state of the art, prior to the present invention. The present invention offers a significant improvement by providing a process for efficiently mapping a plurality of association keys, by using a plurality of Association Key Servers 140 to manage a trade-off between sequence length and the size of the Association Key Server 140 pool. In an embodiment, such as that shown in FIG. 3, this trade-off is successfully managed by as few as two Association Key Servers. Furthermore, a key aspect of the system present in the invention is its inherent ability to adapt to large scales of data. As either the number of iterations in the sequence or the number of Association Key Servers 140 grows, the quantity of possible keys (and thus the number of unique locations, for example either geographic locations or internet service providers, that can be uniquely mapped) grows dramatically. The quantity of Association Key Servers 140 represents the base number and every iteration represents an additional exponential grows of that base. For example, two Association Key Servers 140 with three iterations would produce two to the power of three possible keys, or 8. Raising the number of iterations to four allows for 16 and again to 5 allows for 32. Adding additional Association Key Servers 140 has an even greater effect as with just five key servers at three, four and five iterations you achieve a keys space of 125, 625 and 3125 possible unique keys respectively. In order to mitigate additional service latency caused by increasing numbers of iterations, identically configured sets of Association Key Servers 140 can, in at least some embodiments, be distributed geographically near to the End-user Devices 100 ensuring minimal impact on the service's performance.

FIG. 2 illustrates the process by which the Association Key Servers 140 of an embodiment of a system in accordance with the invention handle requests from End-user Devices 100. In this example, the request is directed to a web server whose content is specific to an association key. For purposes of illustration, the process is presented as a single flow, however, in at least some embodiments, the process will be performed by physically different yet equivalently capable Association Key Servers 140 in accordance with the sequence originally produced by the Authoritative Name Server 125 and delivered through a DNS Resolver 110 to the End-user Device 100.

The End-user Device 100 makes a request to the Association Key Server 140 listed first in the sequence and triggers the processing starting at step 200. The Association Key Server 140 reads the headers of the request which contain, among other things, at least a "host" field at step 205. The "host" field in a standards-compliant web request indicates, at least, the domain or subdomain name of the service for which the request was intended. At step 210, the Association Key Server 140 determines if the Universal Resource Locator (URL) associated with the request contains a partial association key. If it does the server will read that partial key at step 215.

At step 220, the Association Key Server 140 will append its preconfigured key fragment onto the partial key, which may be empty if step 210 determines that no partial key was included in the request. Key fragments are configured on each of the Association Key Servers 140 such that each unique server has a distinct fragment. As this process repeats for the Association Key Servers 140, dictated by the sequencing, the partial key will grow as the concatenation of these distinct fragments. This mechanism uniquely transcribes a distinct sequence originally dictated by the Authoritative Name Server 125 through the DNS Resolvers 110 to a distinct association key transmitted as part of a standards compliant exchange between an End-user Device 100 and a Service Server 130.

At step 225 the Association Key Server 140 determines if it is the last server that the End-user Device 100 must contact in order to build an association key. This determination is based on the domain name read as part of the "host" in step 205. Association Key Servers 140, in at least some embodiments, are configured with the domain names associated with the sequence that all End-user Devices 100 contacting that specific service will traverse. If this is not the final server, the sequence is not complete, and the Association Key Server 140 determines the next domain name in the sequence at step 230. Then, at step 235, the next domain name and the current partial key are used to construct a standard HTTP response, which causes the End-user Device 100 to make a request to the next domain name passing along the partial key as part of the URL. The server transmits this response to the End-user Device 100 at step 240, and the process effectively repeats after the End-user device 100 queries its associated DNS Resolver 110 to map the next domain name to a network address. The Association Key Server 140 that corresponds to the returned network address performs the next iteration of the process and may or may not be the same server that performed the current iteration.

If instead, the Association Key Server 140 determines that it is the last server in the sequence, it will create a different standard HTTP response which causes the End-user Device 100 to make its next request to the Service Server 130 with a fully formed association key as part of the URL. The server transmits this response at step 240 and the process is fully complete at step 250.

One skilled in the art can appreciate that the process of the present invention, illustrated and discussed hereinabove, iteratively transcribes data encoded within the operational process of standard DNS by the Authoritative Name Server 125 into service and/or protocol specific metadata attached to a request made by an End-user Device 100. In the exemplary embodiment, this data is attached to an HTTP request and used to key more specific data; however, in at least some embodiments the data can be directly derived through proper configuration of the Association Key Servers 140 so that the resultant association key is the desired data directly and not an abstraction thereof. As a result, data encoded in accordance with the invention can be made available to the plurality of protocols and applications which utilize DNS as an infrastructural component, for example, SIP which is used primarily in VoIP and Video Conferencing solutions, RTSP which is used in streaming video solutions and XMPP which is used for internet messaging and chat solutions. Those skilled in the art will recognize that this list is not exhaustive, and the system can be easily added to any protocol, including proprietary protocols where you can control both the client and server. In FIG. 3, the timeline of interactions between End-user Devices 100, DNS Resolvers 110, Service Servers 130 and Association Key Servers 140 can be better appreciated. As before, a web server whose content is specific to an association key is used as an exemplary embodiment solely for purposes of illustration. In this embodiment, two Associated Key Servers 140A and 140B are configured with key fragments "A" and "B" and respond to the network addresses "10.0.1.1" and "10.0.1.2", respectively. The Service Server 130 responds to the network address "10.0.0.1".

The End-user Device 100 intends to connect to the service represented by the URL "www.service.com" and, as a result, at transmission 3000 issues a request to its associated DNS Resolver 110 to provide a mapping of that domain name to a network address. The DNS Resolver 110 has no copy of that mapping in its connected Resolver Cache 115, so, at transmission 3005, it issues a request for the mapping of subdomains to the Authoritative Name Server 125 for "service.com". The Authoritative Name Server 125 responds at transmission 3010 with a mapping that is the same for all DNS Resolvers 110 and indicates that the network address for the "www" subdomain is "10.0.0.1". At transmission 3015, the DNS Resolver 110 sends this information to the End-user Device 100, which now possesses the requisite information to make the initial request to the service.

At transmission 3020, the End-user Device 100 makes the initial request to the Service Server 130 which responds to "10.0.0.1". This initial request contains no association key and as a result, the Service Server responds, at transmission 3025, with a redirect to the first domain in the sequence of Association Key Servers 140.

This domain is not a domain that End-user Device 100 has a mapping for and, as such, at 3030 it transmits a request for the network address mapped by "stage1.location.com". The DNS Resolver 110 has no copy of this mapping either, and so at 3035 it sends a request for the mapping of subdomains to the Authoritative Name Server 125 associated with "location.com". For the purpose of illustration, the Authoritative Name Server 125 for both "service.com" and "location.com" are the same server although in at least some embodiments they will be distinct devices. At this point, the Authoritative Name Server 125 generates a response which is unique to the DNS Resolver 110 that initiated the request. Encoded within the response are the subdomains that an End-user Device 100 connects to as part of the key derivation sequence and a unique mapping of those subdomains to the set of network addresses that represent Association Key Servers 140. This unique response is transmitted at 3040 to the DNS Resolver 110 which, in at least some embodiments, will store a copy of the response in its connected Resolver Cache 115 in order to expedite future requests. Additionally, the DNS Resolver 110 will respond to the initial request for "stage1.location.com" with the network address of "10.0.1.1", the address associated with Association Key Server 140A containing the key fragment "A", to the End-user Device 100 at transmission 3045.

The End-user Device 100 can now comply with the redirect response from the Service Server 130, and transmits the initial key derivation request at 3050 to the Association Key Server 140 which responds to the network address "10.0.1.1". Transmissions 3055 through 3110 represent similar iterations through the key derivation process. Each response from an Association Key Server 140, indicates the next subdomain in the sequence "stage1.location.com", "stage2.location.com", "stage3.location.com", "stage4.location.com". In turn, the End-user Device 100 requests the mapping of these subdomains to proper network addresses. Note that while "stage1", "stage3" and "stage4" are all unique subdomains, they map to the same network address and as a result the same Association Key Server 140A whose associated key fragment is "A". Alternatively, "stage2" maps to a different Association Key Server 140B whose associated key fragment is "B".

In each iteration, the Association Key Server 140 generates a redirect to the next subdomain in the sequence that includes the partial key from the request it received, for example "k=AB", appended with its own associated key fragment, for example "k=ABA". This transcription of information contained and served by the Authoritative Name Server 125 to request data, through a sequence of subdomain names, continues until, during the processing of transmission 3110, the Association Key Server 140 recognizes "stage4.location.com" to be the last subdomain name in the sequence. The Association Key Server 140 transmits the final redirect back to the initial domain name at transmission 3115 containing the completed key "k=ABAA" formed by the incoming partial key "k=ABA" and the server's key fragment "A".

The End-user Device 100 transmits a new request to the Service Server 130 which responds to "10.0.0.1" at transmission 3120. This new request contains a complete association key so the Service Server 130 responds with the content specifically associated with that key at transmission 3125. Once the association has been established, the End-user Device 100 can request additional content and receive specifically associated content without having to re-execute the key derivation sequence as represented by transmissions 3130 and 3135. In at least some embodiments, for example a web server whose content depends on the derived key, the key may be recorded to the End-user Device 100 in, for instance, a HTTP Cookie so that future interactions with the server may skip the key derivation process by presenting a previously derived and stored key as part of the initial request.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A system for associating with an end-user information that is not personally identifiable to the end-user through the development of an association key comprising:
    a plurality of association key servers configured to decode encoded information as key fragments and for communicating with an end-user device using a protocol required by the end-user,
    at least one DNS resolver system associated with an end-user for receiving service requests from the end-user, and for requesting mappings of network addresses, and
    authoritative name server for communicating to the DNS resolver system a sequence of encoded information for use by the association key servers to develop an association key in response to contacts from an end-user device that are made in the order defined by the sequence provided by the authoritative name server to iteratively transcribe data encoded within an operational process of a DNS into metadata specific to the protocol required by the end-user to thereby associate with at least one end-user information relevant to that end-user without requiring anything on the end-user device other than a standards-compliant web browser,
    wherein the encoded information is mapped as potential association key fragments to an N-tree where N is the number of association key servers, and the appropriate association key server is selected by the DNS resolver system based on which child of the N-tree at depth D is in the path leading to the desired key fragment's tree node, where D is the current stage ordinal.

2. The system of claim 1 wherein the appropriate association key server is selected by the DNS resolver system using the value of S digit of the desired key's encoding as an index into the list of key association servers, where S is the current stage ordinal.

* * * * *